US009529105B2

(12) United States Patent
Collins et al.

(10) Patent No.: US 9,529,105 B2
(45) Date of Patent: Dec. 27, 2016

(54) ACOUSTIC LOGGING SYSTEMS AND METHODS EMPLOYING MULTI-MODE INVERSION FOR ANISOTROPY AND SHEAR SLOWNESS

(75) Inventors: Mark Vincent Collins, Houston, TX (US); Arthur Cheng, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 86 days.

(21) Appl. No.: 14/388,197

(22) PCT Filed: Apr. 2, 2012

(86) PCT No.: PCT/US2012/031912
§ 371 (c)(1),
(2), (4) Date: Sep. 25, 2014

(87) PCT Pub. No.: WO2013/151531
PCT Pub. Date: Oct. 10, 2013

(65) Prior Publication Data
US 2015/0049585 A1 Feb. 19, 2015

(51) Int. Cl.
*G01V 1/34* (2006.01)
*G01V 1/50* (2006.01)
*G01V 1/40* (2006.01)

(52) U.S. Cl.
CPC ............. *G01V 1/345* (2013.01); *G01V 1/50* (2013.01); *G01V 1/40* (2013.01); *G01V 2210/626* (2013.01); *G01V 2210/74* (2013.01)

(58) Field of Classification Search
CPC ...... G01V 1/50; G01V 1/345; G01V 2210/74; G01V 2210/626; G01V 1/40
(Continued)

(56) References Cited

U.S. PATENT DOCUMENTS 6,449,560 B1 9/2002 Kimball
6,611,761 B2 8/2003 Sinha et al.
(Continued)

FOREIGN PATENT DOCUMENTS

WO  WO-2013/151531  10/2013

OTHER PUBLICATIONS

Thomsen, Leon "Weak Elastic Anisotropy", Society of Exploration Geophysicists, Geophysics, Oct. 1986, p. 1954-1966, vol. 51, No. 10.
Tang, X.M. et al., "Quantitative Borehole Acoustic Methods", Handbook of Geophysical Exploration: Seismic Exploration, (2004), p. 58-79, 187-196, & 202-209, vol. 24, Elsevier Ltd., London, UK.
(Continued)

*Primary Examiner* — Daniel L Murphy
(74) *Attorney, Agent, or Firm* — Iselin Law PLLC; Benjamin Fite

(57) ABSTRACT

Acoustic logging systems and methods are provided with multi-mode inversion for at least vertical shear slowness and shear anisotropy. At least some method embodiments acquire waveforms for multiple acoustic wave modes as a function of tool position in a borehole, derive position-dependent mode dispersion curves from the waveforms, match the derived dispersion curves with parameterized dispersion curves to determine a vertical shear slowness and a shear anisotropy as a function of position, and displaying a borehole log that represents at least one of the vertical shear slowness and the shear anisotropy as a function of position. The objective function employed for the inversion is evaluated across multiple wave propagation modes and mud slownesses and may employ an adaptive, frequency-dependent weighting based on distance between the derived dispersion curves and the parameterized dispersion curves.

18 Claims, 4 Drawing Sheets

(58) Field of Classification Search
USPC .......................................................... 367/35
See application file for complete search history.

(56) References Cited

U.S. PATENT DOCUMENTS

| | | |
|---|---|---|
| 6,714,480 B2 | 3/2004 | Sinha et al. |
| 6,920,082 B2 | 7/2005 | Tang |
| 7,120,541 B2 | 10/2006 | Wang |
| 7,463,550 B2 | 12/2008 | Sinha et al. |
| 7,755,972 B2 | 7/2010 | Yogeswaren et al. |
| 7,764,572 B2 | 7/2010 | Wu et al. |
| 2003/0167835 A1 | 9/2003 | Sinha et al. |
| 2004/0257911 A1 | 12/2004 | Tang et al. |
| 2008/0319675 A1 | 12/2008 | Sayers |
| 2009/0185446 A1 | 7/2009 | Zheng et al. |
| 2010/0085835 A1 | 4/2010 | Tang et al. |
| 2011/0058451 A1 | 3/2011 | Yoneshima |
| 2011/0134720 A1 | 6/2011 | Bratton et al. |

OTHER PUBLICATIONS

PCT International Search Report and Written Opinion, dated Jul. 6, 2012, Appl No. PCT/US2012/031912, "Acoustic Logging Systems and Methods Employing Multi-Mode Inversion for Anisotropy and Shear Slowness", Filed Apr. 2, 2012, 9 pgs.

Franco, Arroyo J.L. et al., "Sonic Investigations In and Around the Borehole", Oilfield Review, Schlumberger, Spring 2006, p. 14-33.

PCT International Preliminary Report on Patentabillity, dated Mar. 20, 2014, PCT/US2012/031912, "Acoustic Logging Systems and Methods Employing Multi-Mode Inversion for Anisotropy and Shear Slowness," Filed Apr. 2, 2012, 17 pgs.

AU Patent Examination Report No. 1, dated Nov. 13, 2014, Appl No. 2012376243, "Acoustic Logging Systems and Methods Employing Multi-Mode Inversion for Anisotropy and Shear Slowness," Filed Apr. 2, 2012, 3 pgs.

EP Extended Search Report, dated Jan. 4, 2016, Appl. No. 12873730.1, "Acoustic Logging Systems and Methods Employing Multi-Mode Inversion for Anisotropy and Shear Slowness," Filed Apr. 2, 2012, 7 pgs.

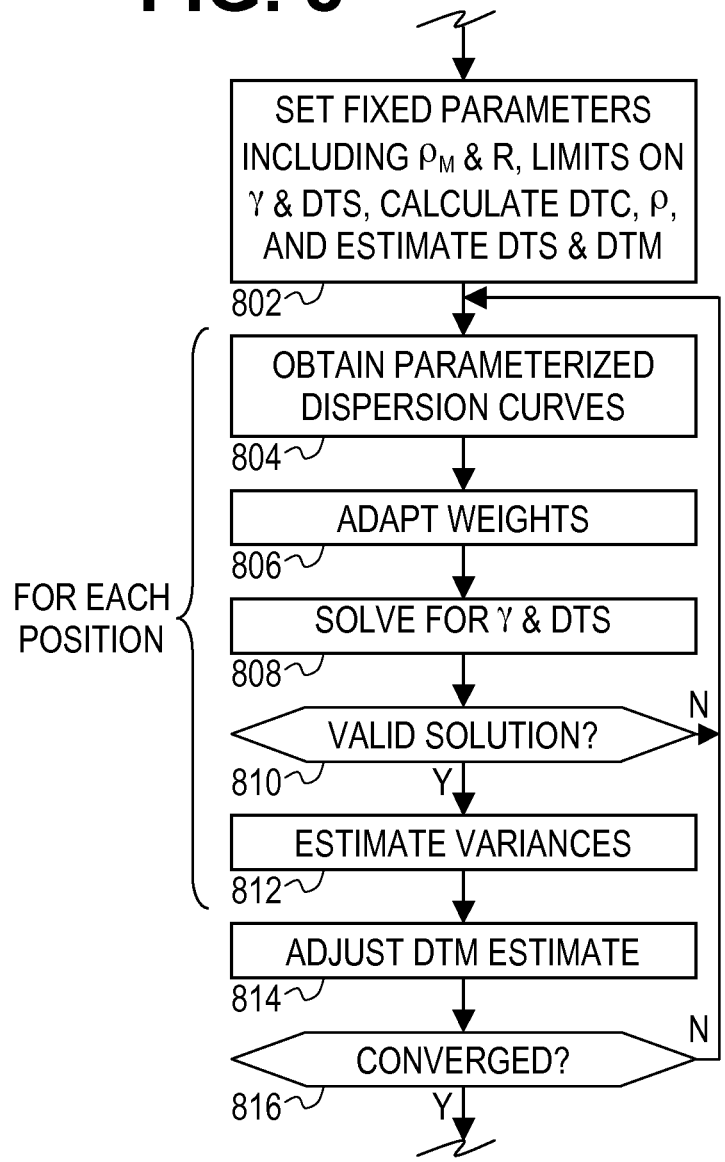

ACOUSTIC LOGGING SYSTEMS AND METHODS EMPLOYING MULTI-MODE INVERSION FOR ANISOTROPY AND SHEAR SLOWNESS

BACKGROUND

In the quest for hydrocarbon reservoirs, companies employ many data-gathering techniques. The most detailed, albeit localized, data comes from well logging. During the well-drilling process, or shortly thereafter, driller pass logging instruments through the well bore to collect information about the surrounding formations. The information is traditionally collected in "log" form, i.e., a table, chart or graph of measured data values as a function of instrument position. The most sought-after information relates to the location and accessibility of hydrocarbon gases and fluids.

Resistivity, density, and porosity logs have proven to be particularly useful for determining the location of hydrocarbon gases and fluids. These logs are "open hole" logs, i.e., log measurements that are taken before the formation face is sealed with tubular steel casing. Acoustic logging tools provide measurements of acoustic wave propagation speeds through the formation. There are multiple wave propagation modes that can be measured, including compressional and flexural. Taken together, the propagation speeds of these various modes often indicate formation density and porosity.

Acoustic logging measurements are also valuable for determining the velocity structure of subsurface formations, which information is useful for migrating seismic survey data to obtain accurate images of the subsurface formation structure. Subsurface formations are often anisotropic, meaning that the acoustic waves propagation speed depends on the direction in which the wave propagates. Most often the formations, even when anisotropic, are relatively isotropic in the horizontal plane. This particular version of anisotropy is often called vertical transverse isotropy (VTI). Accurate imaging requires that such anisotropy be accounted for during the migration process. When sufficiently precise, such imaging enables reservoirs to be delineated from surrounding formations, and further indicates the presence of formation boundaries, laminations, and fractures, which information is desired by the reservoir engineers as they formulate a production strategy that maximizes the reservoir's economic value.

BRIEF DESCRIPTION OF THE DRAWINGS

Accordingly, there are disclosed herein in the drawings and detailed description specific embodiments of acoustic logging systems and methods employing multi-mode inversion for anisotropy and shear slowness. In the drawings:

FIG. 8 is a flowchart of an illustrative multi-mode inversion method.

Figure 1:
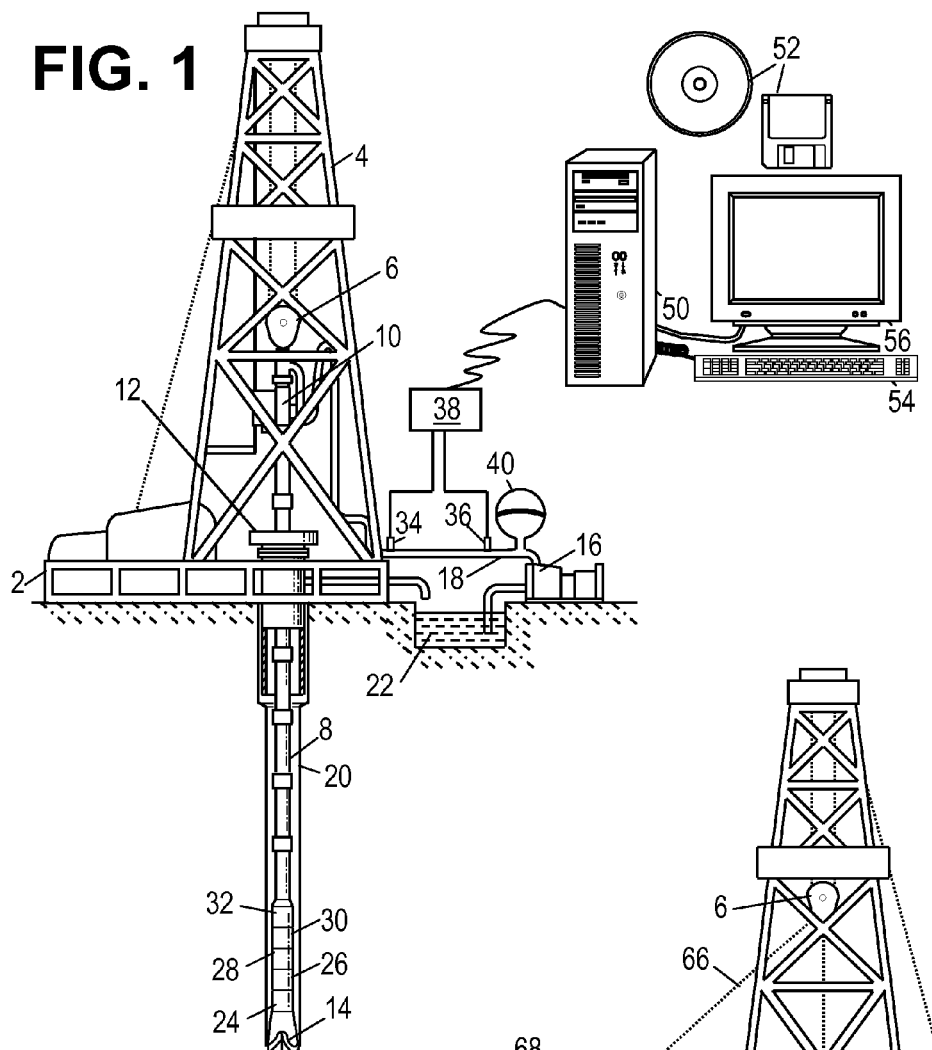
FIG. 1 shows an illustrative logging-while-drilling (LWD) environment.

It should be understood, however, that the specific embodiments given in the drawings and detailed description do not limit the disclosure. On the contrary, they provide the foundation for one of ordinary skill to discern the alternative forms, equivalents, and modifications that are encompassed in the scope of the appended claims.

DETAILED DESCRIPTION

The disclosed embodiments can be best understood in the context of their environment. Accordingly, FIG. 1 shows an illustrative logging while drilling (LWD) environment. A drilling platform 2 is equipped with a derrick 4 that supports a hoist 6. The rig operator drills an oil or gas well using a string of drill pipes 8. The hoist 6 suspends a top drive 10 that rotates the drill string 8 as it lowers the drill string through the wellhead 12. Connected to the lower end of the drill string 8 is a drill bit 14. The bit 14 is rotated and drilling accomplished by rotating the drill string 8, by use of a downhole motor near the drill bit, or by both methods. Recirculation equipment 16 pumps drilling fluid through supply pipe 18, through top drive 10, and down through the drill string 8 at high pressures and volumes to emerge through nozzles or jets in the drill bit 14. The drilling fluid then travels back up the hole via the annulus formed between the exterior of the drill string 8 and the borehole wall 20, through a blowout preventer, and into a retention pit 24 on the surface. On the surface, the drilling fluid is cleaned and then recirculated by recirculation equipment 16. The drilling fluid carries cuttings from the base of the bore to the surface and balances the hydrostatic pressure in the rock formations.

The bottomhole assembly (i.e., the lowermost part of drill string 8) includes thick-walled tubulars called drill collars, which add weight and rigidity to aid the drilling process. The thick walls of these drill collars make them useful for housing instrumentation and LWD sensors. Thus, for example, the bottomhole assembly of FIG. 1 includes a natural gamma ray detector 24, a resistivity tool 26, an acoustic logging tool 28, a neutron porosity tool 30, and a control & telemetry module 32. Other tools and sensors can also be included in the bottomhole assembly, including position sensors, orientation sensors, pressure sensors, temperature sensors, vibration sensors, etc. From the various bottomhole assembly sensors, the control and telemetry module 32 collects data regarding the formation properties and/or various drilling parameters, and stores the data in internal memory. In addition, some or all of the data is transmitted to the surface by, e.g., mud pulse telemetry.

Telemetry module 32 modulates a resistance to drilling fluid flow to generate pressure pulses that propagate to the surface. One or more pressure transducers 34, 36 (isolated from the noise of the mud pump 16 by a desurger 40) convert the pressure signal into electrical signal(s) for a signal digitizer 38. The digitizer 38 supplies a digital form of the pressure signals to a computer 50 or some other form of a data processing device. Computer 50 operates in accordance with software (which may be stored on information storage media 52) and user input received via an input device 54 to process and decode the received signals. The resulting telemetry data may be further analyzed and processed by computer 50 to generate a display of useful information on a computer monitor 56 or some other form of a display device. For example, a driller could employ this system to obtain and view an acoustic slowness and anisotropy log.

Figure 2:
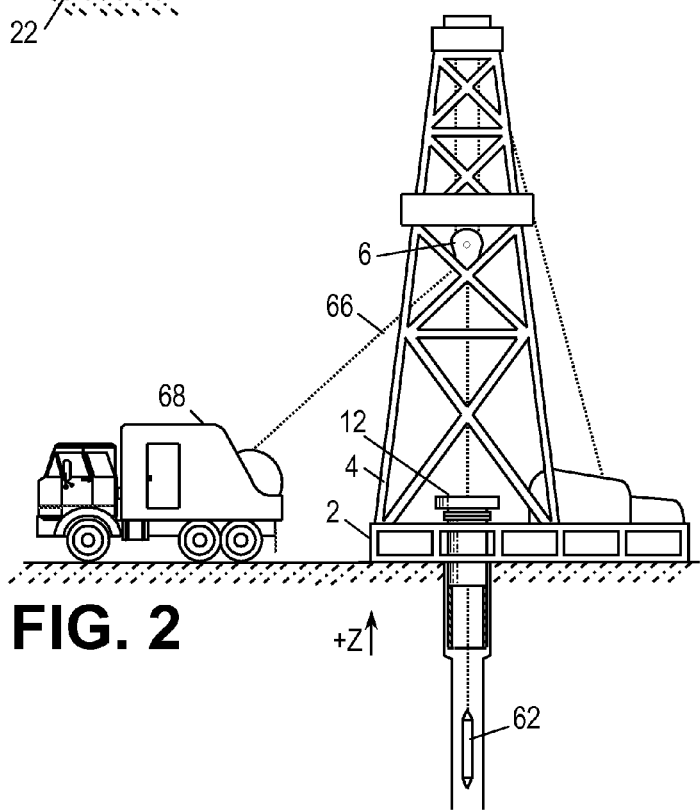
FIG. 2 shows an illustrative wireline logging environment.

At various times during the drilling process, the drill string 8 may be removed from the borehole as shown in FIG. 2. Once the drill string has been removed, logging operations can be conducted using a wireline logging tool 62, i.e., a sensing instrument sonde suspended by a cable 66 having conductors for transporting power to the tool and telemetry from the tool to the surface. The wireline tool assembly can include an acoustic density logging tool similar to the LWD embodiment described hereinbelow. Other formation property sensors can additionally or alternatively be included to measure formation properties as the tool is pulled uphole. A logging facility 68 collects measurements from the logging tool 62, and includes computing facilities for processing and storing the measurements gathered by the logging tool.

Figure 3A:
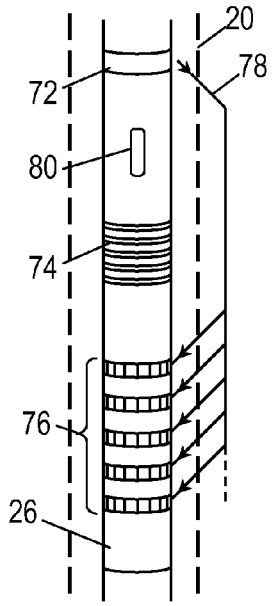
FIG. 3A shows an illustrative acoustic logging tool.

FIG. 3A shows an illustrative LWD embodiment of acoustic logging tool 26 in a borehole 20. The logging tool 26 includes a monopole acoustic source 72, an acoustic isolator 74, an array of acoustic receivers 76, and a multi-pole source 80. The multi-pole source may be a dipole, crossed-dipole, quadrupole, hexapole, or higher-order multi-pole transmitter. Some tool embodiments may include one acoustic source that is configurable to generate different wave modes rather than having separate transmitter sources, but in each case the source(s) are designed to generate acoustic waves 78 that propagate through the formation and are detected by the receiver array 76. The acoustic source may be made up of piezoelectric elements, bender bars, or other transducers suitable for generating acoustic waves in downhole conditions. The contemplated operating frequencies for the acoustic logging tool are in the range between 0.5 kHz and 30 kHz, inclusive. The operating frequency may be selected on the basis of a tradeoff between attenuation and wavelength in which the wavelength is minimized subject to requirements for limited attenuation. Subject to the attenuation limits on performance, smaller wavelengths may offer improved spatial resolution of the tool.

The acoustic isolator 74 serves to attenuate and delay acoustic waves that propagate through the body of the tool from the source 72 to the receiver array 76. Any standard acoustic isolator may be used. Receiver array 76 can include multiple sectorized receivers spaced apart along the axis of the tool. (One such sectorized receiver 58 is illustrated in cross-section in FIG. 3B). Although five receivers are shown in FIG. 3A, the number can vary from one to sixteen or more.

Figure 3B:
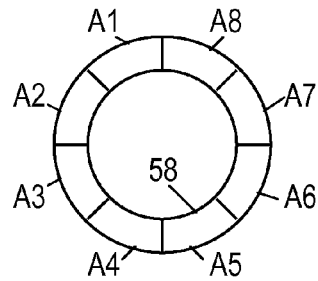
FIG. 3B shows an illustrative receiver having azimuthal sensitivity.

Each sectorized receiver 58 includes a number of azimuthally spaced sectors. Referring momentarily to FIG. 3B, a receiver 58 having eight sectors A1-A8 is shown. However, the number of sectors can vary and is preferably (but not necessarily) in the range between 4 and 16, inclusive. Each sector may include a piezoelectric element that converts acoustic waves into an electrical signal that is amplified and converted to a digital signal. The digital signal from each sector is individually measured by an internal controller for processing, storage, and/or transmission to an uphole computing facility. Though the individual sectors can be calibrated to match their responses, such calibrations may vary differently for each sector as a function of temperature, pressure, and other environmental factors. Accordingly, in at least some embodiments, the individual sectors are machined from a cylindrical (or conical) transducer. In this fashion, it can be ensured that each of the receiver sectors will have matching characteristics.

When the acoustic logging tool is enabled, the internal controller controls the triggering and timing of the acoustic source 72, and records and processes the signals from the receiver array 76. The internal controller fires the acoustic source 72 periodically, producing acoustic pressure waves that propagate through the fluid in borehole 20 and into the surrounding formation. As these pressure waves propagate past the receiver array 76, they cause pressure variations that can be detected by the receiver array elements.

The receiver array signals may be processed by the internal controller to determine the true formation anisotropy and shear velocity, or the signals may be communicated to the uphole computer system for processing. The measurements are associated with borehole position (and possibly tool orientation) to generate a log or image of the acoustical properties of the borehole. The log or image is stored and ultimately displayed for viewing by a user.

Figure 4:
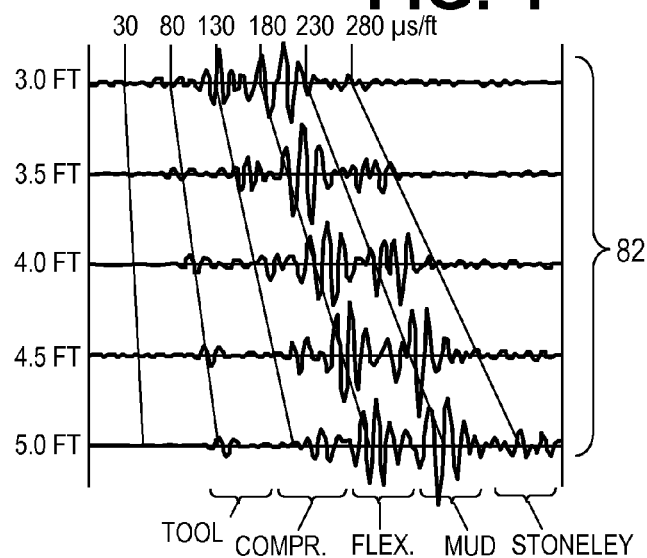
FIG. 4 shows illustrative receive waveforms.

FIG. 4 shows a set of illustrative amplitude versus time waveforms 82 detected by the receiver array 76 in response to one triggering of the source 72. The receivers are located at 3, 3.5, 4, 4.5, and 5 ft from the acoustic source, and various slowness value slopes are shown to aid interpretation. The time scale is from about 80 to 1500 μs. Each of the waveforms is shown for a corresponding receiver as a function of time since the transmitter firing. (Note the increased time delay before the acoustic waves reach the increasingly distant receivers.) After recording the waveforms, the internal controller typically normalizes the waveforms so that they have the same signal energy.

The detected waveforms represent multiple waves, including waves propagating through the body of the tool ("tool waves"), compression waves from the formation, shear waves from the formation, waves propagating through the borehole fluid ("mud waves"), and Stoneley waves propagating along the borehole wall. Each wave type has a different propagation velocity which separates them from each other and enables their velocities to be independently measured using, e.g., the semblance processing techniques disclosed by B. Mandal, U.S. Pat. No. 7,099,810 "Acoustic logging tool having a quadrupole source".

The receiver array signals may be processed by a downhole controller to determine $V_S$ (the formation shear wave velocity) and $V_C$ (the formation compression wave velocity), or the signals may be communicated to the uphole computer system for processing. (Though the term "velocity" is commonly used, the measured value is normally a scalar value, i.e., the speed. The speed (velocity) can also be equivalently expressed in terms of slowness, which is the reciprocal of speed.) When the velocity is determined as a function of frequency, the velocity may be termed a "dispersion curve", as the variation of velocity with frequency causes the wave energy to spread out as it propagates.

The acoustic velocity measurements are associated with borehole position (and possibly tool orientation) to generate a log or image of the acoustical properties of the borehole. The log or image is stored and ultimately displayed for viewing by a user.

The illustrative acoustic logging tool 26 may further include a fluid cell to measure acoustic properties of the borehole fluid. Specifically, the fluid cell measures $V_M$, the velocity of compression waves in the borehole fluid and $\rho_M$, the density of the borehole fluid. (Alternatively, the acoustic impedance $Z_M = \rho_M V_M$ can be measured.) Various suitable fluid cells exist in the art, such as e.g., the fluid cell employed by the Halliburton CAST-V™ wireline tool, or that disclosed by B. Mandal, U.S. Pat. No. 6,957,700 "Self-calibrated ultrasonic method of in-situ measurement of borehole fluid acoustic properties". The fluid cell can be operated in a manner that avoids interference from firings of the source 72, e.g., the borehole fluid property measurements can be made while the source 72 is quiet, and the formation wave velocity measurements can be made while the fluid cell is quiet. Alternatively, the acoustic properties of the borehole fluid can be measured at the surface and subjected to corrections for compensate for temperature and pressure variation.

Figure 5:
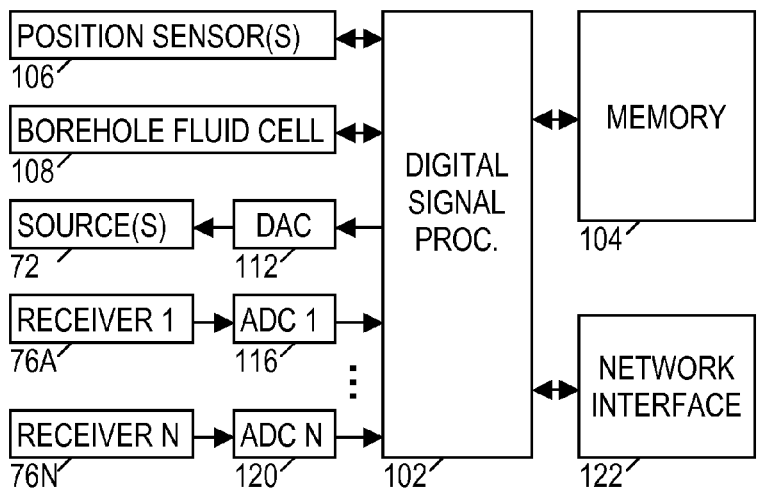
FIG. 5 is a functional block diagram of illustrative tool electronics.

FIG. 5 is a functional block diagram of the illustrative acoustic logging tool 26. A digital signal processor 102 operates as an internal controller for tool 26 by executing software stored in memory 104. The software configures the processor 102 to collect measurements from various measurement modules such as position sensor 106 and fluid cell 108. (Note that these modules can alternatively be implemented as separate tools in a wireline sonde or bottomhole assembly, in which case such measurements would be gathered by a control/telemetry module.)

The software further configures the processor 102 to fire the source(s) 72 via a digital to analog converter 112, and further configures the processor 102 to obtain receive waveforms from receiver array 76 via analog to digital converters 116-120. The digitized waveforms can be stored in memory 104 and/or processed to determine compression and shear wave velocities. As explained further below, the processor can process the dispersion curve measurements to derive at least formation shear velocity and acoustic anisotropy. Alternatively, these measurements can be communicated to a control module or a surface processing facility to be combined there. In either case, the derived acoustic properties are associated with the position of the logging tool to provide a formation property log. A network interface 122 connects the acoustic logging tool to a control/telemetry module via a tool bus, thereby enabling the processor 102 to communicate information to the surface and to receive commands from the surface (e.g., activating the tool or changing its operating parameters).

Figure 6:
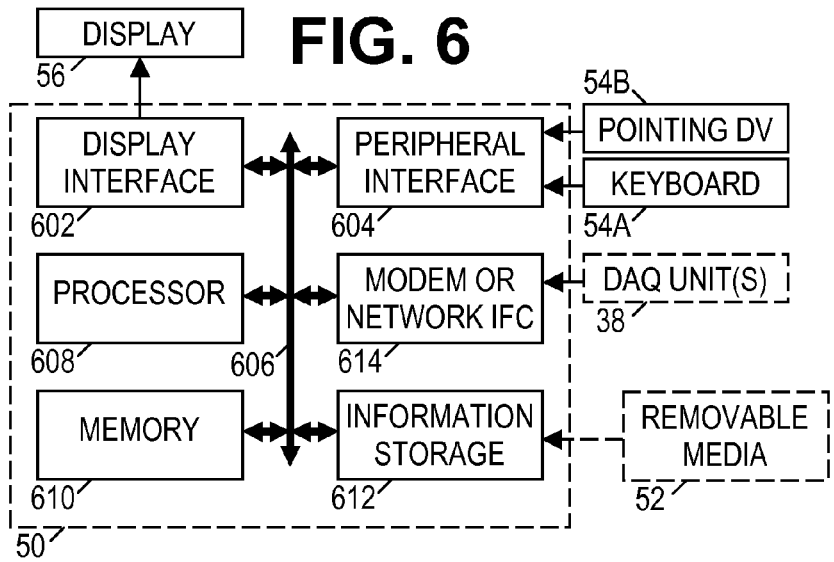
FIG. 6 shows an illustrative system for implementing methods disclosed herein.

FIG. 6 is a block diagram of an illustrative surface processing system suitable for collecting, processing, and displaying logging data. In some embodiments, a user may further interact with the system to send command to the bottom hole assembly to adjust its operation in response to the received data. The system of FIG. 6 can take the form of a computer that includes a chassis 50, a display 56, and one or more input devices 54A, 54B. Located in the chassis 50 is a display interface 602, a peripheral interface 604, a bus 606, a processor 608, a memory 610, an information storage device 612, and a network interface 614. Bus 606 interconnects the various elements of the computer and transports their communications.

In at least some embodiments, the surface telemetry transducers are coupled to the processing system via a data acquisition unit 38 and the network interface 614 to enable the system to communicate with the bottom hole assembly. In accordance with user input received via peripheral interface 604 and program instructions from memory 610 and/or information storage device 612, the processor processes the received telemetry information received via network interface 614 to construct formation property logs and display them to the user.

The processor 608, and hence the system as a whole, generally operates in accordance with one or more programs stored on an information storage medium (e.g., in information storage device 612 or removable information storage media 52). Similarly, the bottom hole assembly control module and/or acoustic logging tool controller 102 operates in accordance with one or more programs stored in an internal memory. One or more of these programs configures the tool controller, the bottomhole assembly control module, and the surface processing system to individually or collectively carry out at least one of the acoustic logging methods disclosed herein.

Given the foregoing context, we now turn to a discussion of formation properties. In 1986, Leon Thomsen published a paper "Weak Elastic Anisotropy" in which he proposed the use of three parameters to characterize transversely isotropic materials. In terms of the components of the elastic stiffness matrix (in Voigt notation with index 3 indicating the axis of symmetry), one of the three parameters was defined:

$$\gamma = \frac{C_{66} - C_{44}}{2C_{44}}, \tag{1}$$

where, as an aside, we note that the stiffness constant $C_{44}$ equals the shear modulus for a vertically-traveling shear wave, and stiffness constant $C_{66}$ equals the shear modulus for a horizontally-traveling shear wave. At times hereafter, this parameter may be referred to as the shear wave anisotropy. A perfectly isotropic formation would have $\gamma=0$, while many shale formations often have shear wave anisotropies on the order of 20-30%. VTI information plays an important role in seismic imaging of reservoirs, thus it is desirable to obtain VTI information as a function of depth from acoustic logging tools. Such measurements can be influenced by a variety of factors including mud speed, borehole rugosity, contact between the tool and the wall ("road noise"), formation inhomogeneity, mode contamination from off-centering, and drilling noise.

Figure 7:
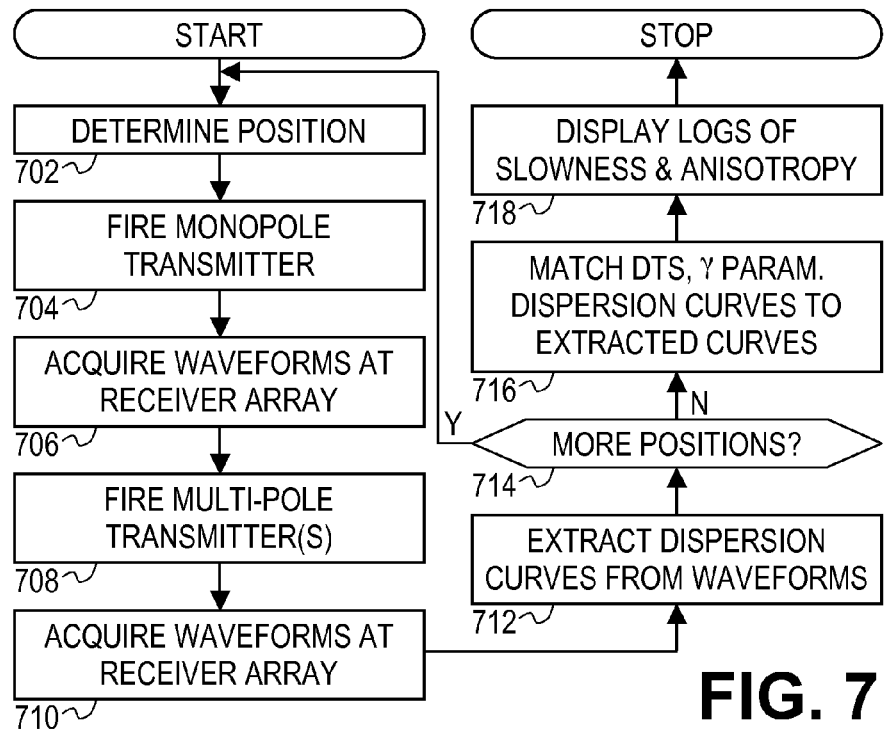
FIG. 7 is a flowchart of an illustrative acoustic density logging method.

FIG. 7 is a flowchart of an illustrative acoustic logging method that employs multi-mode inversion for anisotropy and shear slowness. Beginning in block 702, the position of the logging tool along the borehole is determined. Where the tool provides azimuthal sensitivity, the position determination includes a determination of the tool's rotational orientation. The tool may also measure the acoustical properties of the borehole fluid using a fluid cell. The measured properties would include the acoustic impedance of the borehole fluid, or alternatively the density of the fluid and the propagation velocity of acoustic waves through the fluid. In block 704, the tool fires the monopole transmitter to generate acoustic waves that propagate primarily in the compressional and Stoneley wave modes, and in block 706 the logging tool acquires waveform signals from the receiver array. The signals may be combined to enhance the desired waveform modes before being stored.

In block 708 the tool fires the multi-pole transmitter to generate acoustic waves that propagate in a flexural or higher-order mode. In block 710, the logging tool again acquires waveform signals from the receiver array, this time combining them to enhance the array response to the flexural or higher-order mode. In block 712, the tool extracts the dispersion curves for the desired wave modes from the stored waveforms and saves them with the associated position information. The curves can be computed by any one of many possible frequency semblance algorithms. In block 714, the tool determines whether the logging process should continue, and if so, blocks 702-714 are repeated.

In block 716, the extracted dispersion curves are processed by the tool and/or the surface processing system to determine the best-matching parameterized dispersion curves. This operation is discussed in more detail below, and it results in a determination of at least a shear wave anisotropy and slowness for each of multiple positions in the borehole. In block 718, the system displays logs of the shear wave anisotropy and/or slowness.

The operations described in FIG. 7 can be distributed throughout the logging system or concentrated within the internal processor for the logging tool. Thus, for example, the position measurements, fluid measurements, and waveform measurements can be made by separate tools and communicated to a separate processing facility where the density calculation is performed. Moreover, the operations can be carried out in a parallel or asynchronous fashion even though they are described for explanatory purposes as occurring in a sequential order.

FIG. 8 is a flowchart of an illustrative multi-mode inversion process. This process assumes the availability of a pre-computed library of dispersion curves, i.e., the expected slowness of a given acoustic wave mode as a function of frequency for a given set of parameters. Methods for computing such dispersion curves are known. See, e.g., Tang, "Method and apparatus for determining earth formation shear-wave transverse isotropy from borehole Stoneley wave measurements", U.S. Pat. No. 6,920,082. In at least one embodiment, the model parameters include mud slowness (dtm), compressional wave slowness (dtc), vertical shear wave slowness (dts, abbreviated in the following equations as s), shear wave anisotropy ($\gamma$), borehole radius (r), formation density ($\rho$), and mud density ($\rho_m$). With these seven parameters, a corresponding dispersion curve can be retrieved from the library. A direct retrieval may be possible if the parameter values correspond precisely to the values of a precomputed curve, but more often the system will employ some form of interpolation to derive the desired dispersion curve from the precomputed curves for nearby parameter values.

Denote the portion of the (possibly non-uniform) library parameter grid coordinates spanning ($\gamma_{min}$, $\gamma_{max}$) and $dts_{est} \pm DS$ as $$(\gamma_n, s_m) = (\gamma_{n-1}, s_{m-1}) + (\Delta\gamma_n, \Delta s_m), m=1, \ldots, M-1;$$
$$n=1, \ldots, N-1 \quad (2)$$

The grid resolution may be designed to be fine enough so that theoretical dispersion curves off the grid can be accurately estimated by linear interpolation. The grid defines a mesh of interpolation regions in any of several possible ways, but for the sake of providing a concrete example we will define a triangular mesh with vertices $$\Delta_{jnm} = \{(\gamma_{n+j}, s_{m+j}), (\gamma_{n+1}, s_m), (\gamma_n, s_{m+1})\}, j=0,1;$$
$$n=0, \ldots, N-2; m=0, \ldots, M-2. \quad (3)$$

The slowness of mode X within a triangle is expressible as $$S_X(f,\gamma,s) = S_X(f,\gamma_{n+j}, s_{m+j}) + (\gamma - \gamma_{n+j})a_{X,jnm} + (s - s_{m+j})b_{X,jnm}$$
$$(\gamma, s) \in \Delta_{jnm}, \quad (4)$$

where the coefficients as a function of frequency are given by $$a_{X,jnm} = \frac{S_X(f, \gamma_{n+1} s_{m+j}) - S_X(f, \gamma_n, s_{m+j})}{\Delta\gamma_{n+1}} \quad (5)$$

$$b_{X,jnm} = \frac{S_X(f, \gamma_{n+j} s_{m+1}) - S_X(f, \gamma_{n+j}, s_m)}{\Delta s_{m+1}}$$

With this framework in place, we select an objective function for the inversion algorithm to minimize with respect to $\gamma$ and s. A suitable function is the L2 norm:

$$L2 = \sum_{X,f} [S_X(f, \gamma, s) - S_X^d(f)]^2 W_X(f), \quad (6)$$

where $W_X(f)$ is a frequency dependent weighting (described further below) and $S_X^d(f)$ is the dispersion curve computed from the data library for acoustic wave propagation mode X. Differentiation and algebraic manipulation show that the anisotropy $\gamma$ and shear wave slowness s that minimize the L2 norm are the solutions to the following:

$$A \begin{bmatrix} \gamma - \gamma_n \\ s - s_m \end{bmatrix} = \begin{bmatrix} u_\gamma \\ u_s \end{bmatrix}, \quad (7)$$

where $$A \equiv \begin{bmatrix} \sum_{X,f} W_X a_{X,jnm}^2 & \sum_{X,f} W_X a_{X,jnm} b_{X,jnm} \\ \sum_{X,f} W_X a_{X,jnm} b_{X,jnm} & \sum_{X,f} W_X b_{X,jnm}^2 \end{bmatrix}. \quad (8)$$

and $$\begin{bmatrix} u_\gamma \\ u_s \end{bmatrix} \equiv -\begin{bmatrix} \sum_{X,f} W_X a_{X,jnm}(S_X(\gamma_{n+j}, s_{m+j}) - S_X^d) \\ \sum_{X,f} W_X b_{X,jnm}(S_X(\gamma_{n+j}, s_{m+j}) - S_X^d) \end{bmatrix} \equiv \quad (9)$$

$$-\begin{bmatrix} \sum_{X,f} W_X a_{X,jnm} c_{X,jnm} \\ \sum_{X,f} W_X b_{X,jnm} c_{X,jnm} \end{bmatrix}$$

For brevity, the frequency dependence of the variables in equations (8)-(9) has been suppressed.

Note that other weighting-dependent objective functions and inversion algorithms may alternatively be used. It is not necessary that the objective functions provide an analytic solution. For example, the L1 norm could be used together with a simplex inversion algorithm.

A solution to equation (7) can be found for each mesh triangle. The solution that lies within the boundaries of the triangle giving rise to it will be the correct solution.

$$(\gamma_{jnm}, s_{jnm}) \in \Delta_{jnm}. \quad (10)$$

It is possible due to numerical errors that a correct solution lying near the boundary might be calculated to be just outside the boundary, so this possibility should be accounted for. The theoretical dispersion curves generally change monotonically with respect to ($\gamma$,s), so if the theoretical dispersion curves are a good fit to the data dispersion curves a single solution can be found via an iterative search. However, in the case of extremely noisy data or data that does not match the theoretical dispersion curves (e.g., due to borehole breakout), multiple solutions can exist. In this situation, the inversion might average the solutions and take the locus of the solutions as the uncertainty. Alternatively, the inversion might perform an exhaustive search to identify the global minimum as the solution. In either case, the result should be flagged as suspect due to poor data quality.

Other possible reasons for the system being unable to determine a solution might include the correct solution being located outside the library grid. In this case the library should be expanded to include the necessary region. If the chosen acoustic modes all have small or uneven sensitivities to the anisotropy and slowness parameters, the $a_{X,jnm}$ and/or $b_{X,jnm}$ coefficients near the minimum may be extremely small, making the matrix in equation (7) ill-conditioned. In this case, different or additional modes should be included in the analysis. In any event any solutions found are preferably flagged as suspect and ignored when doing the mud slowness inversion described further below.

Though the foregoing example only interpolates over Thomsen coefficient and vertical shear, one can extend the equations in a straightforward manner to invert for other parameters as well, though execution time will increase as a result.

As previously indicated, using a noisy portion of the dispersion curves to do the inversion can adversely affect the inversion process. The effect of noise can be reduced by associating a frequency-dependent weighting function with each of the acquired dispersion curves from the tool. This can be done if we note that the set of theoretical curves used for a given depth provide an estimate of what the shape of the dispersion curves computed from the data should look like if no noise were present. Using this a priori knowledge we can estimate what portions of the dispersion curves computed from the data have substantial noise and compute a weighting function to dampen those frequencies. For convenience drop the subscripts on the triangle symbol, $\Delta$. Define the function $S_{X,\Delta}^d$ as $$S_{X,\Delta}^d(f) = S_X^d(f) - S_{X,\Delta}(f), \qquad (11)$$

where the function $S_{X,\Delta}(f)$ is the average of the theoretical dispersion curves over the vertices of the triangle. The noise in the neighborhood, Df, of a given frequency is estimated for a triangle from the normalized variance, $$\Sigma_{X,\Delta}^d(f) = \frac{1}{N_f} \sum_{f'=f-Df}^{f'=f+Df} \left[ \frac{S_{X,\Delta}^d(f') - \overline{S}_{X,\Delta}^d(f)}{S_{X,\Delta,MAX} - S_{X,\Delta,MIN}} \right]^2, \qquad (12)$$

where $S_{X,\Delta,MAX}$ and $S_{X,\Delta,MIN}$ are the maximum and minimum slowness values over all frequencies of $S_{X,\Delta}$, and $\overline{S}_{X,\Delta}^d$ is the mean of $S_{X,\Delta}^d$ over the frequency band. The variance computed in equation (12) can be used to compute weights.

One illustrative embodiment employs the following weighting function:

$$W_{X,\Delta}(f) = \frac{\min_f \left( \sqrt{\Sigma_{X,\Delta}^d(f)} \right)}{\sqrt{\Sigma_{X,\Delta}^d(f)}}. \qquad (13)$$

This function gives the measured dispersion curve more weight where its shape looks like the shape of the theoretical dispersion curves. If the variance is low relative to other parts of the dispersion curve it will have a relatively high weighting. If the dispersion curve drifts or oscillates wildly at low or high frequency due to poor SNR, the weighting is less.

One possible problem occurs if the dispersion curve drifts and then flattens out at low or high frequency. Then the flat region would have a substantial weight. This effect can be reduced by limiting the frequency range. Find the frequency, $f_{max}$, corresponding to the maximum of equation (13). Recompute equation (12) using $\overline{S}_{X,\Delta}^d(f) = \overline{S}_{X,\Delta}^d(f_{max})$ and normalize it. Denote the result as $\Sigma_{X,MAX}^d(f)$. Then compute new weights, $W'_{X,\Delta}(f)$, by masking the weights of equation (13) as follows:

$$W'_{X,\Delta}(f) = \begin{cases} W_{X,\Delta}(f) & \text{for } f_1 < f < f_2 \\ 0 & \text{otherwise} \end{cases} \qquad (14)$$

where $f_1$ is the highest frequency less than $f_{max}$ such that $\Delta_{X,MAX}^d(f) > W_{X,\Delta}(f)$ and $f_2$ is the lowest frequency greater than $f_{max}$ such that $\Sigma_{X,MAX}^d(f) > W_{X,\Delta}(f)$. The low and high frequency regions where the dispersion curves drift are suppressed. Regions with small ripple have higher weights as desired.

The weighting functions of equations (13) or (14) can be applied in equations (8)-(9) for each triangle, or we can average over the triangles to get a single set of weights. One may also elect to zero out the weights when they fall below a threshold. Another alternative is to take the n'th root of the weights after masking to flatten them. Other alternatives can be readily conceived. Specifically, the set of theoretical curves used for a given depth provide an estimate of what the shape of the dispersion curves computed from the data should look like if no noise were present. Using this a priori knowledge we can estimate what portions of the dispersion curves computed from the data have substantial noise and compute a weighting function to dampen those frequencies.

Returning to FIG. 8, the inversion process begins in block 802 with the setting of "fixed", i.e., independently measured parameters such as drilling fluid ("mud") density $\rho_m$ and borehole radius r. The limits on the range of anisotropy parameter values and shear wave slowness values are also set based on the user's experience and expectations. Compressional wave slowness dtc and formation density $\rho$ are also derived from the waveform measurements using standard techniques (e.g., measuring the arrival time of the compressional wave mode). Finally initial estimates of the drilling fluid ("mud") slowness dtm, the shear wave slowness dts, and the anisotropy $\gamma$ are made. These initial estimates can be made in any suitable fashion including the use of default values, user input, or average values from previous acoustic logs in the region.

Based on the current parameter values, the inversion process obtains from the library the relevant dispersion curves in block 804. In block 806, the weight function is determined, then in block 808 the process solves for shear wave slowness and anisotropy value. These values are treated as updated (hopefully improved) estimates. In block 810, the process determines whether the solution is acceptable, e.g., whether the solution values are within the boundaries of the current mesh triangle, or whether some other indication exists that the solution has converged or a global minimum for the objective function has been reached. If not, a new mesh triangle is chosen based on the updated slowness and anisotropy values and blocks 804-806 are repeated.

Once a valid solution has been found, the process may estimate the variance or uncertainty associated with the solution values. For a signal without noise, we have (the subscript t denotes truth)

$$\begin{bmatrix} \Delta \gamma_t \\ \Delta s_t \end{bmatrix} \equiv \begin{bmatrix} \gamma_t - \gamma_0 \\ s_t - s_0 \end{bmatrix} \qquad (15)$$

$$= A^{-1} \begin{bmatrix} -\sum_{X,f} W_X(f, S_X^d) a_X(f)(S_X(f) - S_{X,t}(f)) \\ -\sum_{X,f} W_X(f, S_X^d) b_X(f)(S_X(f) - S_{X,t}(f)) \end{bmatrix},$$

and for the same signal with noise we have $$\begin{bmatrix} \Delta\gamma_d \\ \Delta s_d \end{bmatrix} \equiv \begin{bmatrix} \gamma_d - \gamma_0 \\ s_d - s_0 \end{bmatrix} \quad (16)$$

$$= A^{-1} \begin{bmatrix} -\sum_{X,f} W_X(f, S_X^d) a_X(f)(S_X(f) - S_X^d(f)) \\ -\sum_{X,f} W_X(f, S_X^d) b_X(f)(S_X(f) - S_X^d(f)) \end{bmatrix},$$

where $a_X$, $b_X$, $W_X$, $S_X(f)$, and A are computed at $(\gamma_0, s_0)$, a known fixed point on or near the solution of the L2 norm minimization. If multiple firings at a given depth are recorded and we assume the measurements $(\Delta\gamma_{d,i}, \Delta s_{d,i})$ are unbiased estimates of truth, the error can be estimated from the mean and variance. We have $$\begin{bmatrix} \gamma_{est} \\ s_{est} \end{bmatrix} = \begin{bmatrix} \langle \Delta\gamma_{d,i} + \gamma_{0,i} \rangle \\ \langle \Delta s_{d,i} + s_{0,i} \rangle \end{bmatrix} \pm \begin{bmatrix} \sqrt{\frac{\text{var}(\Delta\gamma_{d,i} + \gamma_{0,i})}{N-1}} \\ \sqrt{\frac{\text{var}(\Delta s_{d,i} + s_{0,i})}{N-1}} \end{bmatrix}, \quad (17)$$

where $\langle \rangle$ denotes the mean and N is the number of firings.

Often, however, only one instance of the dispersion curves is available at a given depth, so one may not be able to apply equation (17). In this case, it is still possible to get an estimate of the error if one assumes a particular noise model. Differencing equations (16) and (17) yields $$\begin{bmatrix} \gamma_d - \gamma_t \\ s_d - s_t \end{bmatrix} \equiv \begin{bmatrix} \delta\gamma \\ \delta s \end{bmatrix} = A^{-1} \begin{bmatrix} \sum_{X,f} W_X(f, S_X^d) a_X(f) \delta S_{X,t}^d(f) \\ \sum_{X,f} W_X(f, S_X^d) b_X(f) \delta S_{X,t}^d(f) \end{bmatrix}, \text{ where} \quad (18)$$

$$\delta S_{X,t}^d \equiv S_X^d - S_{X,t} = \quad (19)$$
$$(S_X^d - S_{X,est}) + (S_{X,est} - S_{X,t}) \equiv \delta S_{X,est}^d + \delta S_{X,est}^t, \text{ and}$$

$$S_{X,est}(f, \gamma_d, s_d) = S_X(f, \gamma_0, s_0) + \Delta\gamma_d a_X + \Delta s_d b_X. \quad (20)$$

Noting that optimization of the L2 norm ensures $$\begin{bmatrix} \sum_{X,f} W_X(f, S_X^d) a_X(f) \delta S_{X,est}^d(f) \\ \sum_{X,f} W_X(f, S_X^d) b_X(f) \delta S_{X,est}^d(f) \end{bmatrix} = \begin{bmatrix} 0 \\ 0 \end{bmatrix}, \quad (21)$$

permits equation (18) to be written as $$\begin{bmatrix} \gamma_d - \gamma_t \\ s_d - s_t \end{bmatrix} \equiv \begin{bmatrix} \delta\gamma \\ \delta s \end{bmatrix} = \sum_{X,f} W_X(f, S_X^d) \delta S_{X,est}^t u_X(f), \text{ where} \quad (22)$$

$$u_X(f) \equiv A^{-1} \begin{bmatrix} a_X(f) \\ b_X(f) \end{bmatrix}. \quad (23)$$

The expectation value of the squared error is $$\begin{bmatrix} \langle (\delta\gamma)^2 \rangle \\ \langle (\delta s)^2 \rangle \end{bmatrix} = \begin{bmatrix} \sum_{\substack{X,X' \\ f,f'}} \langle u_{X,1}(f) u_{X',1}(f') W_X(f) W_{X'}(f') \delta S_{X,est}^t(f) S_{X',est}^t(f') \rangle \\ \sum_{\substack{X,X' \\ f,f'}} \langle u_{X,2}(f) u_{X',2}(f') W_X(f) W_{X'}(f') \delta S_{X,est}^t(f) S_{X',est}^t(f') \rangle \end{bmatrix}, \quad (24)$$

where $\langle \rangle$ denotes the ensemble average over the noise model. Note that $u_X$ and the weights depend on the noise. Unfortunately truth is not known in practice, so it is difficult to compute equation (24). One way to get a qualitative estimate of the error is to substitute $\delta S_{X,est}^t \to \delta S_{X,est}^d$ and rely on summation over frequency to give an estimate of the ensemble average. However, with this substitution the estimated error is zero by equation (21). In order to get a stable non-zero result we ignore the correlations between frequencies and mode indices to get a sum of squares. Then equation (24) reduces to $$\begin{bmatrix} \langle (\delta\gamma)^2 \rangle_{est} \\ \langle (\delta s)^2 \rangle_{est} \end{bmatrix} = \begin{bmatrix} \sum_{X,f} W_X^2(f)[A_{11}^{-1} a_X(f) + A_{12}^{-1} b_X(f)]^2 [\delta S_{X,est}^d(f)]^2 \\ \sum_{X,f} W_X^2(f)[A_{21}^{-1} a_X(f) + A_{22}^{-1} b_X(f)]^2 [\delta S_{X,est}^d(f)]^2 \end{bmatrix}. \quad (25)$$

The results from equation (25) can be correlated to actual errors for a given noise model to determine a "fudge factor" for the error estimate, $$\begin{bmatrix} \varepsilon_\gamma \\ s_\gamma \end{bmatrix} \approx \begin{bmatrix} F_\gamma \sqrt{\langle (\delta\gamma)^2 \rangle_{est}} \\ F_s \sqrt{\langle (\delta s)^2 \rangle_{est}} \end{bmatrix}. \quad (26)$$

In at least one embodiment, fudge factors of $(F_s, F_\gamma) \approx (4,4)$ were used to give a confidence level of 90% for the given noise model.

Referring again to FIG. 8, the operations of blocks 804-812 are repeated for each logging tool position to obtain an anisotropy and slowness estimate for the corresponding positions in the borehole. In block 814, the inversion process updates an estimated drilling fluid ("mud") slowness dtm using an objective function that covers multiple positions in the borehole, e.g., the sum of L2 norms over a multiplicity of depths evaluated at the current values of the depth dependent values ($\gamma(dtm)$, $s(dtm)$).

$$L2(dtm) = \quad (27)$$
$$\sum_{X,f,d} [S_X(f, \gamma_d(dtm), s_d(dtm), dtm) - S_X^d(f)]^2 W_{X,d}(f, dtm).$$

Here, the index d refers to depth, and $S_X^d(f)$ is the computed dispersion curve from waveforms at depth d. (The weights should be normalized across depths and mud slowness.

Often the dependence of the weights on mud slowness can be neglected, i.e., if a suitable set of weights that dampens the correct portions of the derived dispersion curves is found for some mud slowness, the same weights can be applied for other mud slowness values since the data itself does not change.) This function can be minimized with respect to mud slowness using a 1-D minimization algorithm. The output is the globally minimized mud slowness and depth dependent Thomsen coefficient and vertical shear slowness. In one embodiment, the mud speed was found by finding the minimum of a fourth order polynomial fit to the objective function.

The error analysis approach outlined above can also be used to get an estimate of mud slowness error. If multiple firings are recorded at each depth the mud slowness and error estimate can be determined in the usual way from the mean and variance. Otherwise an error estimate can be computed as follows.

Neglecting the effect of mud slowness error on the computation of the adaptive weights, and assuming an unknown error in assumed mud slowness, $\Delta s_m \equiv s_m - s_{m,t}$, the linearized error of equation (18) becomes $$\begin{bmatrix} \gamma_d(s_m) - \gamma_t \\ s_d(s_m) - s_t \end{bmatrix} \equiv \begin{bmatrix} \delta\gamma \\ \delta s \end{bmatrix} = \qquad (28)$$

$$\sum_{X,f} W_{Xfd} \delta S^d_{Xf,t} \bar{u}_{Xf} - \Delta s_m \sum_{X,f} W_{Xfd} \Gamma_{Xf}, \text{ where}$$

$$u_{Xf} \equiv A^{-1}(s_m, f) \begin{bmatrix} a_X(s_m, f) \\ b_X(s_m, f) \end{bmatrix}, \qquad (29)$$

$$\delta S^d_{Xf,t} \equiv S^d_X(f) - S_{X,t}(f), \qquad (30)$$

$$W_{Xfd} \equiv W_X(f, S^d_X), \qquad (31)$$

$$\Gamma_{Xf} \equiv [\Delta S_{Xf,t} \partial_{s_m} \bar{u}_{Xf} + \bar{u}_{Xf} \partial_{s_m} S_X(f)], \text{ and} \qquad (32)$$

$$\Delta S_{Xf,t} \equiv S_X(f) - S_{X,t}(f). \qquad (33)$$

All of the terms in equations (29)-(33) are evaluated at truth, $s_{m,t}$. Using equation (28) the linearized mud slowness objective function becomes $$L2(dtm) \equiv \qquad (34)$$

$$\sum_{Xfd} \left( \bar{v}^T_{Xfd} \cdot \sum_{X',f'} W_{X'f'd} \delta S^d_{X'f',t} \bar{u}_{X'f'd} + \Delta s_m \Psi_{Xfd} - \delta S^d_{Xf,t} \right)^2$$

$W_{Xfd'}$ where $$v_{Xfd} \equiv \begin{bmatrix} a_{Xd}(s_{m,t}) \\ b_{Xd}(s_{m,t}) \end{bmatrix}, \qquad (35)$$

$$\Psi_{Xfd} \equiv \qquad (36)$$

$$\Delta\gamma_{d0} \partial_{s_m} a_{Xd} + \Delta s_{d0} \partial_{s_m} b_{Xd} + \partial_{s_m} S_{Xd} - \bar{v}^T_{Xfd} \cdot \sum_{X',f'} W_{X'f'd} \Gamma_{X'f'd},$$

$$\Delta\gamma_{d0} \equiv \gamma_d(s_{m,t}) - \gamma_{0d}, \text{ and} \qquad (37)$$

$$\Delta s_{d0} \equiv s_d(s_{m,t}) - s_{0d}. \qquad (38)$$

Note an additional subscript d has been added to the variables since the linearization point $(\gamma_0, s_0)$ will change from depth to depth.

Minimization of equation (32) with respect to $\Delta s_m$ relates the error in mud slowness to the errors in the waveforms.

$$\Delta s_m = \frac{\sum_{Xfd} \left( \delta S^d_{Xf,t} - \sum_{X'f'} \prod_{XfdX'f'} \delta S^d_{X'f',t} \right) \Psi_{Xfd} W_{Xfd}}{D}, \text{ where} \qquad (39)$$

$$\prod_{XfdX'f'} \equiv v^T_{Xfd} \cdot u_{X'f'd} W_{X'f'd}, \text{ and} \qquad (40)$$

$$D \equiv \sum_{Xfd} \Psi^2_{Xfd} W_{Xfd}. \qquad (41)$$

As before, with no truth data and a single firing at a given depth approximations are made. Assuming the noise is uncorrelated with respect to X, f, and d, and assuming the sum over frequency can approximate the ensemble average, the estimated mud slowness error is $$\varepsilon_{s_m} = F_{s_m} \frac{\sqrt{N}}{D}, \text{ where} \qquad (42)$$

$$N = \sum_{Xfd} [\delta S^d_{Xf,t}]^2 \left\{ \Psi_{Xfd} W_{Xfd} - \sum_{X'f'} \prod_{X'f'dXf} \Psi_{X'f'd} W_{X'f'd} \right\}^2. \qquad (43)$$

Note equation (42) scales as $N_d^{-1/2}$, where $N_d$ is the number of depths. Partial derivatives are computed numerically from the theoretical dispersion curves. Since truth is not known all of the terms in equation (42) are evaluated at the estimated mud slowness, $$s_{m,t} \approx s_m|_{min(L2)}, \qquad (44)$$

and truth is approximated by $$S_{X,t}(f) \approx S_{X,est}(f)|_{min(L2)}. \qquad (45)$$

The error estimate for the slowness and Thomsen coefficient at a given depth can be modified using equation (26).

$$\begin{bmatrix} \varepsilon_\gamma \\ s_\gamma \end{bmatrix} \approx \begin{bmatrix} \sqrt{\langle (F_\gamma \delta\gamma)^2 \rangle_{est} + \left( \varepsilon_{s_m} \sum_{X,f} W_{Xfd} \Gamma_{Xfd,1} \right)^2} \\ \sqrt{\langle (F_s \delta s)^2 \rangle_{est} + \left( \varepsilon_{s_m} \sum_{X,f} W_{Xfd} \Gamma_{Xfd,2} \right)^2} \end{bmatrix}. \qquad (46)$$

These error estimates do not account for interpolation errors due to finite grid spacing. In cases of low sensitivity such errors may dominate.

In block 816, the inversion process determines whether the current parameter values are satisfactory, e.g., by verifying that the updated values are essentially equal to the values determined in a previous iteration. If not, the process repeats blocks 804-816 using the current parameter values as a starting point.

The foregoing process employs adaptive, frequency-dependent weighting to improve immunity to noise, and a consistent inversion across multiple acoustic modes to improve accuracy of position-dependent parameters (shear slowness and anisotropy). Parameters that lack significant position dependence are estimated globally (e.g., mud slowness). The error estimates enable the system to provide the user some indication of the reliability of the estimated parameter values.

Numerous variations and modifications will become apparent to those skilled in the art once the above disclosure is fully appreciated. For example, the logging tools described herein can be implemented as logging while drilling tools and as wireline logging tools. The wave velocities can be measured as velocities rather than slowness values or propagation delays. The choice of which parameters are fixed and which are used in the inversion depends on which parameters are available in a particular situation. One of average skill in the art can modify the foregoing equations accordingly. It is intended that the following claims be interpreted to embrace all such variations and modifications where applicable.

What is claimed is:

1. An acoustic logging method that comprises:
  acquiring waveforms for multiple acoustic wave modes as a function of tool position in a borehole;
  deriving position-dependent mode dispersion curves from the waveforms;
  matching each of the derived dispersion curves, including derived dispersion curves for at least two different-order wave modes, to one of a plurality of parameterized dispersion curves for each respective wave mode to determine a vertical shear slowness and a VTI ("vertical transverse isotropic") shear wave anisotropy as a function of position; and
  displaying a borehole log that represents at least one of the vertical shear wave slowness and the VTI shear wave anisotropy as a function of position.

2. The method of claim 1, wherein the matching employs a frequency-dependent weighting of distance between at least one of the derived dispersion curves and respective parameterized dispersion curves.

3. The method of claim 2, further comprising:
  adjusting the frequency-dependent weighting based on localized variance of the derived dispersion curve from a dispersion curve approximation.

4. The method of claim 3, wherein the dispersion curve approximation is an average of parameterized dispersion curves corresponding to vertices of a face corresponding to the determined vertical shear slowness and VTI shear wave anisotropy.

5. The method of claim 1, further comprising:
  estimating a reliability of the determined vertical shear wave slowness and VTI shear wave anisotropy; and
  displaying the reliability as a function of position.

6. The method of claim 1, wherein said matching is performed with an estimated mud slowness, and wherein the method further comprises:
  repeating said matching with different estimated mud slownesses to optimize the estimated mud slowness.

7. The method of claim 1, wherein the multiple acoustic wave modes include Stoneley and flexural wave modes.

8. The method of claim 1, wherein the multiple acoustic wave modes include a quadrupole wave mode.

9. The method of claim 1, wherein the parameterized dispersion curves depend on mud slowness, compressional wave slowness, vertical shear wave slowness, VTI shear wave anisotropy $\gamma$, borehole radius, formation density, and mud density.

10. An acoustic logging system that comprises:
  an information storage medium having multiple acoustic mode waveforms acquired as a function of position in a borehole;
  a memory having nonlinear inversion software; a display; and
  at least one processor coupled to the memory to execute the nonlinear inversion software, wherein the software causes the processor to determine borehole logs of vertical shear wave slowness and a VTI shear wave anisotropy for presentation on the display by:
  deriving position dependent mode dispersion curves from the waveforms; and
  matching each of the derived dispersion curves, including derived dispersion curves for at least two different-order modes, to one of a plurality of parameterized dispersion curves for each respective wave mode, wherein each parameterized dispersion curve has at least vertical shear wave slowness and VTI shear wave anisotropy as parameters.

11. The system of claim 10, wherein as part of performing said matching, the processor employs a frequency-dependent weighting of distance between at least one of the derived dispersion curves and respective parameterized dispersion curves.

12. The system of claim 11, wherein the processor further adjusts the frequency-dependent weighting based on localized variance of the derived dispersion curve from a dispersion curve approximation.

13. The system of claim 12, wherein the dispersion curve approximation is an average of parameterized dispersion curves corresponding to vertices of a face corresponding to the determined vertical shear wave slowness and VTI shear wave anisotropy.

14. The system of claim 10, wherein the processor further estimates a reliability of the determined vertical shear wave slowness and VTI shear wave anisotropy, and displays the reliability as a function of position.

15. The system of claim 10, wherein the processor performs said matching with an estimated mud slowness, and wherein the processor further repeats said matching with different estimated mud slownesses to optimize the estimated mud slowness.

16. The system of claim 10, wherein the multiple acoustic wave modes include Stoneley and flexural wave modes.

17. The system of claim 10, wherein the multiple acoustic wave modes include a quadrupole wave mode.

18. The system of claim 10, wherein the parameterized dispersion curves depend on mud slowness, compressional wave slowness, vertical shear wave slowness, VTI shear wave anisotropy $\gamma$, borehole radius, formation density, and mud density.

* * * * *

UNITED STATES PATENT AND TRADEMARK OFFICE
CERTIFICATE OF CORRECTION

PATENT NO. : 9,529,105 B2  
APPLICATION NO. : 14/388197  
DATED : December 27, 2016  
INVENTOR(S) : Mark Vincent Collins and Arthur Cheng Page 1 of 1

It is certified that error appears in the above-identified patent and that said Letters Patent is hereby corrected as shown below:

Column 8, Line 10, the word "yand" should read as --$\gamma$ and--

Signed and Sealed this  
Twenty-ninth Day of August, 2017

Joseph Matal  
*Performing the Functions and Duties of the*  
*Under Secretary of Commerce for Intellectual Property and*  
*Director of the United States Patent and Trademark Office*